April 1, 1952 F. A. LINDLEY ET AL 2,591,660

STABILIZED ELECTRICAL SYNCHRONIZING SYSTEM

Filed Nov. 8, 1947

INVENTOR.
Frederick A. Lindley
and Frederick M. Arbuckle
BY Chester H. Braselton
Attorney Patented Apr. 1, 1952 2,591,660

UNITED STATES PATENT OFFICE 2,591,660

STABILIZED ELECTRICAL SYNCHRONIZING SYSTEM

Frederick A. Lindley, Flushing, N. Y., and Frederick M. Arbuckle, Allenhurst, N. J., assignors to Radio-Television Institute, Inc., New York, N. Y., a corporation of New York Application November 8, 1947, Serial No. 784,916

9 Claims. (Cl. 250—36)

Figures 1, 2, 3, 4, 5, 6, 7:
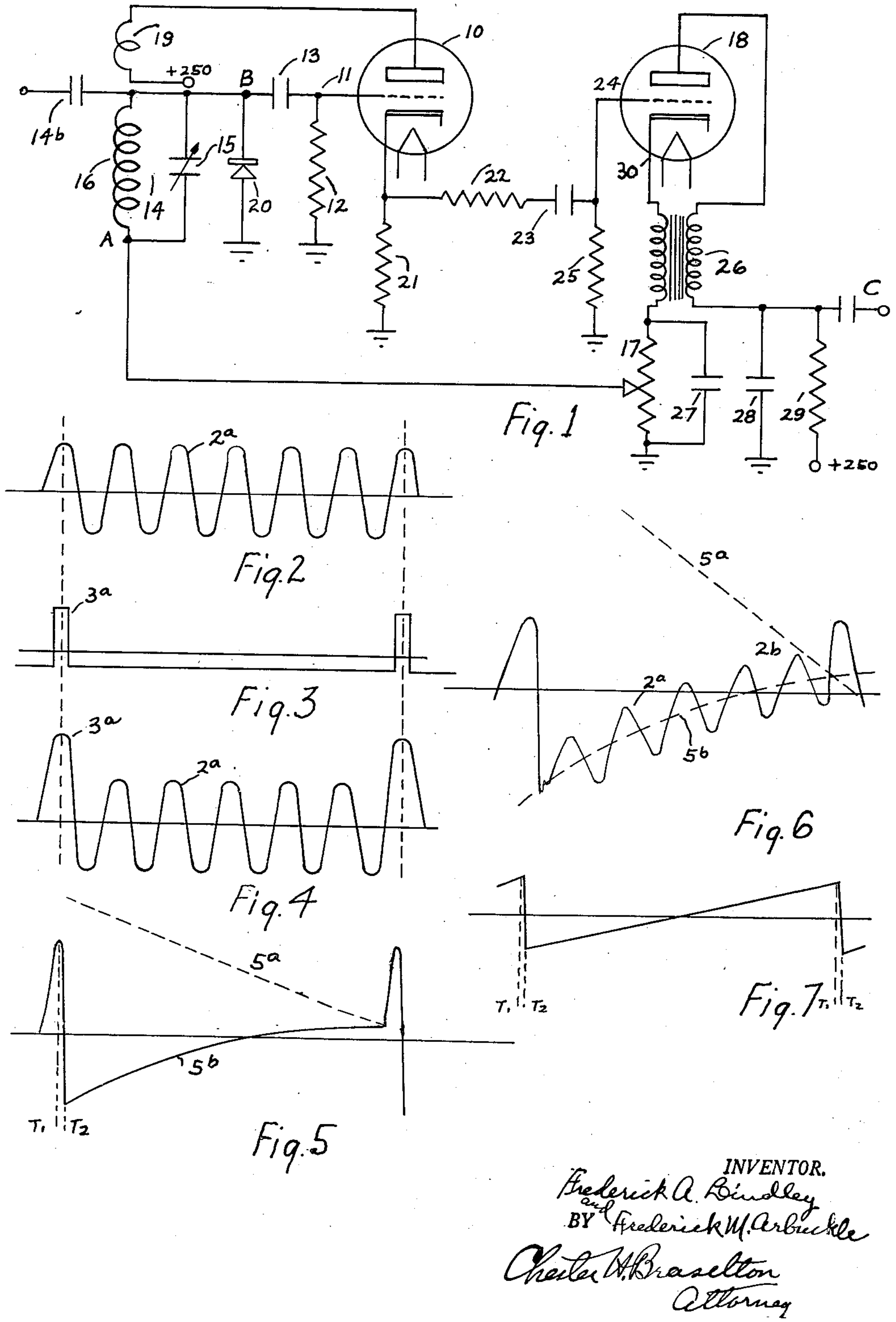

This invention relates to improved electrical means applicable to the synchronization of multivibrator wave generating devices, said means finding ready application to the synchronization of multivibrator sweep signal generators commonly used as deflection signal sources for cathode ray tubes employed in the reproduction of television signals. More particularly this invention is an improvement on my previously filed application, Serial No. 784,915, filed November 8, 1947.

In present day television systems employing R. M. A. television standards the picture information as generated by an iconoscope or other picture signal generating means is used to modulate a radio frequency transmitter. The signal thus transmitted is received by the antenna of the television receiver and suitably amplified through radio frequency amplifiers to a proper level and demodulated to separate the composite television signal envelope from the amplified radio frequency signal. The composite signal information is then amplified and treated by various electronic schemes to supply picture or line information, which modulates the electron beam within the cathode ray tube reproducer. Other information is separated from this composite signal which is directly used to synchronize the electron beam deflection system used in conjunction with the cathode ray tube reproducer. The characteristics of the composite signal which are useful in this synchronism are termed vertical and horizontal synchronizing pulses, which are usually of such greater amplitude with respect to the video information transmitted in the composite modulated television signal so as to be easily detected and separated from the picture information itself. Since the received vertical synchronizing pulses control or synchronize the vertical sweep means for the reproducing tube, hence being a determinant of the number of frames or complete pictures per second that the electron beam will scan while moving at its horizontal rate, and correspondingly the horizontal pulses controlling the number of lines or complete horizontal translations per second of the electron beam across the tube screen, it is necessary in most commonly employed systems to insure faithful reproduction of transmitted synchronizing information as applied to the deflection circuits in the television receiver. Should any static or other interference of a type causing amplitude distortion of the television signal be superimposed upon the television signal in such a way as to distort the synchronizing pulse, the sweep functions of the cathode ray tube deflection circuits might well be synchronized in error and the genesis of the horizontal and vertical traces, which should correspond in time to the respective transmissions of the horizontal and vertical synchronizing pulses, may be timed in error or completely absent, thus destroying or materially reducing the steadiness and clearness of the received television picture.

It is therefore an object of this invention to describe a method of timing axis synchronization employing a multivibrator type of wave generating device which is economical and simple of construction, and having the advantage that it produces a timing axis wave form which is substantially in the correct timing relation to the synchronizing pulse, even under the conditions that the synchronizing pulse is not properly received due to interference or signal fading, consequently preserving the overall picture structure received during the absence of the synchronizing pulse and reducing the well known tearing out of the horizontal structure due to noise and interference.

It is also a purpose of this invention to describe an improved synchronizing means which may be advantageously applied to the sweep circuits in television receivers designed to obtain their high voltage supply for cathode ray tube operation by use of the sharp impulse type wave form characteristics of the return trace found in the horizontal deflection system, which necessarily renders the voltage so produced dependent upon the proper timing of the sawtooth generating device in the sweep circuit, which, through the embodiment of this invention, is maintained substantially constant and independent of the received signal impulse.

It is further an object of this invention to disclose a multivibrator signal means which, in itself, reduces the need for noise-free synchronizing pulse at the receiver location.

It is further and finally an object of this invention to offer a substantial improvement in the operational stability of the means employed in the realization of the aforesaid purposes or objects over and above that provided by the similar means disclosed in my aforementioned application.

It is further and finally an object of this invention to offer a substantial improvement in the operational stability of the means employed in the realization of the aforesaid purposes or objects over and above that provided by the similar means disclosed in my aforementioned application.

Other objects and advantages will become apparent in perusing the following disclosure and study of the embodiments shown in the following drawings, wherein:

Fig. 1 is a diagrammatic representation of a preferred embodiment of our invention, and Figs. 2, 3, 4, 5, 6 and 7 are illustrations of electrical wave forms which are peculiar to the mode of operation of this invention as applied in the embodiment shown in Fig. 1.

The embodiment shown in Fig. 1 comprises a vacuum tube 10 connected as an oscillator having a cathode output arrangement with its control grid 11 supplied with a return path to ground through resistor 12, and a grid coupling condenser 13 which is suitably connected to the oscillator tank circuit 14. This oscillator tank circuit comprises a variable condenser 15 and fixed inductance 16, the lower end of which, indicated at A Fig. 1, is maintained at some positive potential above the ground by merit of point A being connected to the center tap of the potentiometer 17, placed in the cathode circuit of the vacuum tube 18. The tickler coil 19, which is connected in the plate circuit of tube 10, is inductively coupled to the tank circuit through a proper polarity of mutual inductance to the inductance 16, this polarity of mutual inductance being such as to cause self-oscillation of the vacuum tube 10 in a conventional manner. Across the high side of the tank circuit 14 (point B Fig. 1), to ground is connected the diode 20, the diode being so polarized with respect to the high side of the tank circuit so as to conduct whenever point B goes sufficiently negative with respect to ground. The oscillator voltage developed by the tube 10 is developed across the resistor 21, said voltage being applied through isolating resistor 22 and coupling condenser 23, to the grid of vacuum tube 18, having its grid 24 returned to ground through grid leak resistor 25. Cathode and plate circuits of the vacuum tube 18 include separate windings of the blocking oscillator action in a manner that will be described to fuller extent later in this specification. The cathode circuit of the vacuum tube 18, in addition to one winding of the blocking oscillator transformer 26, may be found to have a self-biasing and regulating resistor 17 and associated by-pass condenser 27. In addition to the plate winding of the blocking oscillator transformer 26 in the plate circuit of vacuum tube 18 there is connected a charging condenser 28 to ground and its associated charging resistor 29 to the power supply source.

The operation of this circuit has been fully described in my aforementioned application, but will be reviewed again in order to clarify the exact nature of the improvement offered by this invention. The vacuum tube 10, having its plate circuit inductively coupled to its grid circuit by mutual inductance of proper polarity existing between tickler coil 19 and tank circuit inductance 16, will cause type vacuum tube 10 to sustain oscillation at a frequency determined by the resonant frequency of the tank circuit 14. This tank circuit 14, however, is shown to be connected to a variable tap on potentiometer 17, which represents a source of positive D. C. voltage above ground. This causes point B, the upper or grid end of the tank circuit 14, to also be of some positive D. C. potential above ground, and, of course, of a magnitude determined by the adjustment of the potentiometer 17, as well as the cathode current passing through the same. The diode 20, as has been described, is so connected to conduct only on negative excursions of the A. C. voltage appearing across the tank circuit 14, which are of a magnitude greater than the positive bias supplied by the potentiometer 17, thus differentially damping the tank circuit 14. The positive polarity derived from the potentiometer 17, in cooperation with the diode 20, is then seen to act as a limiter or amplitude control for the self-excited oscillator, and as such is so adjusted to prevent the grid 11 of the vacuum tube 10 from ever being excited to the point of grid current, thus insuring that for positive excursions of voltage appearing across the grid 11, the relative operating Q of the tank circuit is not damped or diminished. This self-excited oscillator, as such, may be regarded as a separate unit and supplies the other section of this embodiment, comprising a vacuum tube 18 and its associated parameters, with the sine wave voltage shown to be developed across the cathode resistor 21 of vacuum tube 10, and is of a wave form such as is shown in Fig. 2. The frequency of this wave will, of course, be that of the self-excited oscillator and be adjusted to a value dependent upon the repetition rate of the synchronizing pulse with which we desire to synchronize the oscillator.

In the case of present day television standards the repetition rate of the horizontal synchronizing pulse is at a frequency of 15,750 cycles per second, such synchronizing pulse 39 being represented as 3*a* in Fig. 3. A frequency analysis of this synchronizing pulse, as shown in Fig. 3, would reveal that it had usable harmonic content up to the seventh or eighth harmonic, so that should the tank circuit 14 of the oscillator 10 be tuned to some harmonic of the synchronizing pulse repetition rate, the synchronizing pulse, if properly applied, could effectively synchronize the oscillator.

The vacuum tube 18, shown in Fig. 1, and its associated circuit elements comprise what might be termed the second section of the system, and is connected as a blocking or multivibrator type of sawtooth generator and may be considered as such and completely separate from the vacuum tube 10 and its associated oscillator circuit. In the operation of the sawtooth multivibrator, charging condenser 28, from which is supplied the plate voltage for the tube 18, charges through resistor 29 to a point allowing the vacuum tube 18 to conduct. This conduction current, which tends then to discharge the condenser, passes through the plate winding of the blocking oscillator transformer 26, and induces a voltage in the cathode winding of the transformer in such direction as to cause the cathode 30 of the vacuum tube 18 to swing negatively with respect to ground. This negative excursion of the cathode 30 causes the grid 24 of the vacuum tube 18, which is brought to ground through the grid return resistor 25, to go positive with respect to the cathode 30, and consequently causes grid 24 to draw current through the grid return resistor 25. As this grid is caused to draw grid current, the plate current of the tube naturally increases and further discharges the condenser 28, which causes the cathode to go even more negative with respect to ground, and consequently causes the grid to swing more positive with respect to the cathode. This cumulative action is terminated by the grid 24 being left highly negative with respect to ground due to the grid current which flowed during the positive portion of the cycle.

In operation, this peak value of negative grid bias is adjusted to be in excess of that required for plate current cutoff of the plate of the tube 18.

The voltage that would appear across the grid 24 to ground if the oscillator section associated with vacuum tube 10 were inoperative, would appear as shown in Fig. 5. Time T–1 to T–2, would represent the negative excursion of the grid circuit with respect to the ground. The turns ratio of the transformer 26, the value of the resistor 29, and the storage condenser 28, are so selected as to cause the grid 24, as previously described, to be driven to plate current cutoff. It may be noted that at the time the grid is driven positive with respect to the cathode, and subsequently left negative with respect to ground, the plate voltage on the tube would be at its minimum, the heavy conduction of the tube 18 having discharged the condenser 28. Of course the condenser 28 will then begin to charge through the resistor 29, this charging and resultant wave form being represented by Fig. 7. The time constant of resistor 29 and condenser 28 is so selected as to produce a relatively linear increase of voltage across the condenser during the cutoff period of the grid. While this condenser resistor combination is charging, the grid leak condenser 23 in the vacuum tube 18 grid circuit is slowly discharging through resistor 25, having previously accumulated a highly negative charge. As it discharges, of course, it becomes relatively more and more positive with respect to ground and consequently to the cathode of the tube 18. For any given plate voltage on a vacuum tube biased negatively to the extent of plate current cutoff, there is obviously a definite magnitude positive potential which may be applied to the grid, above which plate current will be allowed to flow. This critical grid conducting potential is, in the case of a triode, almost inversely proportional to the voltage appearing across the plate to cathode of the tube. Since this plate voltage in the case of tube 18 is increasing substantially linearily, due to the charging of condenser 28, we may then represent what may be called the critical grid potential, by a dashed line, such as 5*a* in Fig. 5 and Fig. 6. As the critical grid conducting potential of curve 5*a* of the vacuum tube 18, represented by this dashed line in Fig. 5, meets or coincides with the actual grid potential curve represented by the grid discharge curve 5*b*, the plate current begins to flow in the vacuum tube 18 and again the cumulative effect of the blocking oscillator action causes the tube to conduct heavily, and in a very short time, discharges condenser 28 and effects a sharp retrace of voltage in time T–1 to T–2, as shown in Fig. 7. In this multivibrator the useful sawtooth of voltage for further application to deflection circuits is taken from point C to ground, and is of the wave form as shown in Fig. 7, point C being coupled to the voltage appearing across the charging condenser 28. It is seen in the operation of this multivibrator that since the average D. C. potential of the grid 24, with respect to ground, is highly negative, the grid 24 of the vacuum tube 18 never goes positive with respect to ground, although going positive with respect to the cathode. The advantage of this effect is to isolate the excessively sharp current transients necessarily present in the grid circuit of the vacuum tube 18 during the discharge period of the sawtooth wave formation from reaching the oscillator section associated with vacuum tube 10.

Summarizing the general circuit configuration as revealed up to this point, we have established two separate operative sections, a sine wave oscillator associated with tube 10, operating at a harmonic of the synchronizing pulse repetition rate, and which may be synchronized by said pulse, and a second section comprising a multivibrator type circuit associated with vacuum tube 18, the multivibrator circuit being disposed and operated to produce a sawtooth voltage useful in the direct driving of television scanning and deflection circuits.

The voltage generated by the sine wave oscillator employing tube 10 has been shown to appear across cathode resistor. This voltage is now superimposed on the grid circuit of vacuum tube 18 through the resistor 22 and condenser 23. The multivibrator 18 may then be adjusted to operate in cooperation with the vacuum tube 10 as a countdown multivibrator, the multivibrator section itself having a free running base frequency, dependent upon the time constant of resistance 25 and condenser 23. The charging time constant 28 and resistance 29 in the plate circuit of the multivibrator may be then of much larger duration so as to provide maximum linearity of sawtooth voltage rise across the condenser 28. Television standards set forth by R. M. A. require that sawtooth voltage developed across the condenser 28, which is to be used for horizontal sweeping purposes, should be generated at the rate of 15,750 times per second, so as to properly synchronize the action of the multivibrator with the received synchronizing pulse. It is known, however, that we may use any harmonic of this synchronizing pulse to properly synchronize the oscillator associated with vacuum tube 10, as long as the free running frequency of the oscillator is at some reasonably low harmonic of the fundamental repetition rate of the synchronized pulse. Arbitrarily in this embodiment we have chosen the sixth harmonic of the received synchronizing pulse repetition rate to synchronize the oscillator, which accordingly is adjusted to operate at 94.5 kc. This requires that there exist a six to one countdown ratio action between the multivibrator circuit 18 and the oscillator of the vacuum tube 10, thus assuring that the multivibrator operates at one-sixth the 94.5 kc. oscillator frequency, or its required 15,750 cycles per second. The superimposition of the sine wave shown in Fig. 2, which is developed across the cathode resistor 21 of the oscillator 10, said resistor also being a part of the grid circuit of the multivibrator tube 18, upon the grid voltage excursion of vacuum tube 18, represented by Fig. 5, is shown in Fig. 6. This composite wave form illustrates the necessity of the superimposed sine wave voltage being of proper amplitude with respect to the grid excursion amplitude for proper countdown operation.

The synchronizing pulse, after being received and demodulated from the carrier, is suitably amplified and applied to the tank circuit 14 of the sine wave oscillator through coupling condenser 14*b*. This synchronizing pulse is illustrated in Fig. 3 and will be seen to add to the 94.5 kc. sine wave appearing across the tank circuit 14 to produce a complex wave form such as shown in Fig. 4. As previously described, the sixth harmonic of the synchronizing pulse repetition rate acts to synchronize the sine wave oscillator associated with the vacuum tube 10, thus insuring the time relationship between the waves, shown in Figs. 2 and 3, and their sum in Fig. 4. Any noise or interference occurring on the synchronizing pulse will be attenuated by the high Q of the tuned circuit 14 employed as the tank of the oscillator, which is resonant at 94.5 kc. It will be recalled that the diode 20 has been so connected across the tuned circuit 14 to conduct only when point B swings sufficiently negative to overcome the bias obtained by the potentiometer 17. However, on positive excursions of point B the diode does not conduct, and therefore allows the tank circuit 14 to present its maximum Q or frequency discriminative effects to all positively poled signals. Correspondingly, the synchronizing pulses are fed to the tank circuit in a positive direction. Due to the fact that the self-excitation of the oscillator vacuum tube 10 never drives its grid positive with respect to its cathode, due to diode 20, any superimposed signal on the tank circuit which has positive excursions of amplitude greater than the limit of oscillator level, will be passed by the vacuum tube 18 and appear across the cathode circuit, as shown in Fig. 4. Naturally, any interference voltage supplied to the tank circuit 14 in a negative direction will appear highly attenuated across the tank circuit of vacuum tube 10, since the diode 20 acts to conduct in that direction and thus reduces the impedance across the tuned circuit. Now consider the combined action of the synchronized oscillator associated with vacuum tube 10 and the multivibrator associated with vacuum tube 18, the resulting wave form shown in Fig. 6 being apparent on the grid 24 of the vacuum tube 18. Should the synchronizing pulses be imposed across the tuned circuit in a positive direction so as to lift or raise the amplitude of one cycle of the 94.5 kc. wave train appearing across the cathode load resistor 21 of the vacuum tube 10, such lifting action being shown in Fig. 4 as it appears across this cathode circuit, and in Fig. 6 as it subsequently appears in the grid 24 of the multivibrator 23, the raised cycle of the 94.5 kc. wave train will reach amplitudes sufficiently high to cause the grid 24 of the multivibrator tube 18 to reach its critical grid conducting potential and cause the discharge of the condenser 29 to effect the retrace portion of the sawtooth sweep shown as T-1 to T-2 of Fig. 6. Thus the requirements in the television system that the return trace of the sweep sawtooth voltage occurred simultaneously with the arrival of the synchronizing pulse, is met by this system. Failure for the synchronizing pulse to be received will still allow the multivibrator to generate a sawtooth voltage for the sweep deflection circuits at a frequency dependent upon the free rate of frequency of the sine wave oscillator associated with vacuum tube 10. With ideal adjustment in synchronization, 94.5 kc. oscillator will shift frequency only slightly, and be displaced in time very little during the synchronizing pulse absence, the six to one countdown ratio between the multivibrator and oscillator being maintained at all times regardless of a synchronizing pulse presence. Thus the addition of the synchronizing pulse to the wave train generated by the oscillator of less amplitude to cause the multivibrator circuit to fade and create a retrace of the sawtooth sweeping voltage, effectively acts as a framing pulse and provides means for the multivibrator not only to be forced into synchronism by and with the arrived synchronizing waves, but to be in asynchronism and thereby properly framing the received picture horizontally.

In the embodiment shown in Fig. 1, particular attention is invited to the source of biasing voltage for the limiting diode 20. It is apparent that as the plate supply voltage for the circuit shown in Fig. 1 is reduced, the plate and cathode current of vacuum tube 18 will necessarily decrease, thereby reducing the positive bias on the limiting diode 20. This reduction in positive bias may be also incurred due to aging or replacement of vacuum tube 18, and in either case the reduction in positive bias on the limiting diode 20 will necessarily result in a smaller amplitude sine wave across the cathode load resistor 21, associated with the vacuum tube 10. Correspondingly, should there be any increase in cathode current through vacuum tube 18, the positive bias on the limiting diode 20 would increase, and thereby increase the output amplitude of the oscillator 10 across the cathode load resistor 21. Referring to the discussion in reference to Fig. 6, which illustrates the addition of the 94.5 kc. voltage 2a having on it the raised synchronizing pulses, to the typical blocking oscillator type wave form 5b appearing across the grid 24 of vacuum tube 18, it will be remembered that all other things being constant, the amplitude of the 94.5 kc. voltage is critical in the proper maintenance of a predetermined countdown ratio by the multivibrator. With particular reference again to Fig. 6 it may be seen that should the amplitude of the 94.5 kc. oscillator be increased substantially such that cycle 2b, Fig. 6, reached a limit defined by the critical grid conducting voltage curve 5a, the resulting countdown would then be given to one, while substantially reducing the 94.5 kc. amplitude would establish countdowns of seven or more. Let us consider now what would happen if the supply voltage to the circuit of Fig. 1 were to be reduced or the current through the vacuum tube 18 be reduced due to changes in its characteristics, while percentagewise the voltage output of the oscillator 10, as appearing across the cathode resistor 21 were maintained relatively constant. This effect would be the same as had the former been held constant and the latter increased, as a study of Fig. 6 will reveal, and result in a reduction of the countdown ratio. It is therefore necessary that should the operating potential or plate current on vacuum tube 18 be decreased, that a corresponding decrease in oscillator output be established and that this decrease be of a proper magnitude. Thus it is possible, by proper choice of cathode biasing and control resistor 17 in the cathode circuit of vacuum tube 18, and the proper positioning of the take-off tap of the biasing potentiometer 17, to realize a system of relative compensation which results in a great increase in countdown stability. In this respect the present embodiment offers considerable improvement in stability over that shown in my co-pending application, above referred to.

From the foregoing description of the operation of this device it will be seen that this method of sweep synchronization allows for a continuous source of sawtooth sweep voltage for supplying cathode ray tube deflection systems at the horizontal rate of 15,750 cycles per second, even without the arrival of a synchronizing pulse. The maintenance of a frequency close to 15,750 kc. is dependent upon the stability of the sine wave oscillator, oscillating at some higher harmonic of the 15,750 kc., therefore manifesting at higher stability than a multivibrator running free at 15,750 cycles per second. When the synchronizing pulse does arrive it not only synchronizes the sine wave oscillator, but it also frames the picture through the asynchronizing action of the multivibrator, having first been freed from noise by the high Q characteristics of the tuned circuit 14. Variations in amplitude of the synchronizing pulse once the multivibrator has been properly asynchronized or the picture properly framed, are of relatively little importance, since the required voltage to synchronize the sine wave oscillator may well be 1/500 of that necessary to asynchronize the multivibrator or frame the picture. Correspondingly, a small amplitude 94.5 kc. component may be derived from the picture signal through a suitable filter and thus used to synchronize the 94.5 kc. oscillator, whereas the asynchronism of framing must be of necessity accomplished by the arrival of a synchronizing pulse. In such an arrangement the deflection system would operate exactly without synchronizing pulse reception once the asynchronism and framing had been accomplished, either manually or by the reception of one synchronizing pulse at the begining of the reception period, continuous synchronizing reception not being necessary in the employment of this system.

The embodiments of the invention which have been given herein are merely illustrations of how the various features may be accomplished and of the principles involved. It is to be understood that the invention contained herein is capable of embodiment in many other forms and adaptations, without departing from the spirit of the invention and the scope of the appended claims.

What we claim is:

1. In an electrical synchronizing system, a source of synchronizing signal, a sine wave oscillator controlled by the source of synchronizing signals and operating at a harmonic of the synchronizing signal, means for causing that portion of the synchronizing signal employed to synchronize the sine wave oscillator to appear in the output of the sine wave oscillator, a second electrical wave generating means having a vacuum tube operating at a sub-harmonic of the sine wave oscillator whose operation is synchronized by the output of the sine wave oscillator containing, in combination, the wave form generated by the sine wave oscillator and the synchronizing signal, and means connected with said electrical wave generator for developing a control potential in accordance with average space current in the vacuum tube, and means applying the control potential so developed to said sine wave oscillator so as to control the signal amplitude developed thereby and applied to said second wave generating means.

2. In an electrical synchronizing system, an electronic oscillator developing a periodically recurrent output signal of a predetermined fundamental frequency, a second electronic oscillator including a discharge tube adapted for synchronization at a sub-harmonic of the fundamental frequency developed by said first electronic oscillator; means coupling the output signal produced by said first electronic oscillator to said second electronic oscillator for synchronization thereof at some sub-harmonic of said first electronic oscillator such that the exact subharmonic relationship established between said first and second electronic oscillators is determined by the amplitude of the signal applied to said second electronic oscillator through said coupling means for a given set of second electronic oscillator operating conditions; means connected with said second electronic oscillator tube for developing a control potential in accordance with space current conditions in said tube; means connected with said first-named electronic oscillator for controlling the signal amplitude applied to said second electronic oscillator by said first electronic oscillator and means for applying said control potential to said controlling means such that undersirable changes in circuit operating conditions of said second electronic oscillator of a type correctable by a suitable change in applied synchronizing signal amplitude are compensated by proper changes in signal amplitude applied to said second electronic oscillator to maintain a constant frequency relationship between said first and second oscillators.

3. In an electrical synchronizing system, a source of periodically recurrent synchronizing signals; an electronic oscillator including a discharge tube adapted for synchronized operation at a sub-harmonic of the recurrence frequency of said synchronizing signals; a synchronizing terminal connected with said electronic oscillator for application of synchronizing signals, said synchronizing terminal being connected such that the exact sub-harmonic value of synchronized operation of said oscillator is dependent upon the amplitude of the applied signal for a given set of oscillator circuit operating conditions; means responsive to space current conditions in said discharge tube for developing a control potential; means for applying synchronizing signals to said oscillator synchronizing terminal; and means connected with said synchronizing signal applying means for controlling the amplitude of the synchronizing signal so applied to said terminal in accordance with the potential developed by said oscillator circuit responsive means such that undesirable changes in operating conditions of said electronic oscillator of a type correctable by suitable changes in applied synchronizing signal amplitude are compensated by appropriate changes therein.

4. Apparatus according to claim 3 where said electronic oscillator is of the multivibrator type.

5. In an electrical system a first electron tube having an anode, a control electrode and a cathode; means for coupling energy from the anode-cathode circuit of said electron tube to the control electrode-cathode circuit of said electron tube, said means including a resonant circuit for maintaining sustained oscillation of said electron tube at some predetermined frequency; means for controlling the amplitude of oscillation developed by said electron tube in accordance with an applied control potential; a second electron tube having an anode, a cathode and a control electrode connected for oscillation as a countdown multivibrator at a frequency sub-harmonically related to the frequency of oscillations developed by said first electron tube, the exact subharmonic multiple of multivibrator operation for a given anode-cathode current being dependent upon the amplitude controlled oscillatory signal derived from said first electron tube; means responsive to the anode-cathode current of said second electron tube for developing a control potential; and a connection from said last-named means to the first electron tube amplitude controlling means.

6. Apparatus according to claim 5 wherein said amplitude controlling means comprises a unilateral conduction device connected in shunt with the control electrode-cathode circuit of said first electron tube, said shunt connection being connected in series with the control potential developed by said second electron tube anode-cathode responsive means.

7. In an electrical synchronizing system, a source of synchronizing pulses, a sine wave oscillator capable of electrical synchronization, means responsive to a control signal for controlling the signal amplitude developed by said sine wave oscillator, an electrical wave generator capable of synchronization and responsive to the amplitude of the signal applied thereto for synchronization, said electrical wave generator including an electron discharge tube, means for synchronizing the second wave generator by the output of the sine wave oscillator concurrently with the synchronization of the second generator from the signal derived from said source of synchronizing pulses, means connected with the electron discharge tube of said electrical wave generator for developing a control potential in accordance with space current values in said tube, and means for applying said control potential to said sine wave oscillator amplitude controlling means whereby undesirable changes in operating conditions of said electric wave generator of a type inherently correctible by suitable changes in the applied signal amplitude are compensated by appropriate changes in the signal amplitude developed by said sine wave oscillator.

8. In an electrical synchronizing system a source of synchronizing pulses, a sine wave oscillator capable of being timed by said synchronizing pulses, means controlling the signal amplitude developed by said sine wave oscillator in accordance with an electrical control signal, an electrical wave generator including a discharge tube capable of being timed through the application of said synchronizing pulses or the signal developed by said sine wave oscillator, means timing the electrical wave generator from the output of the sine wave oscillator, means for timing the sine wave oscillator by said synchronizing pulses, means for causing the synchronizing pulses applied to the since wave oscillator to appear in the output of the since wave oscillator so as to aid in the timing of the electric wave generator, and means connected with said electric wave generator discharge tube for developing a control potential in accordance with the space current conditions in said tube, and means applying said developed control potential to said since wave oscillator amplitude control means whereby the amplitude of the signal applied to said electric wave generator is rendered to function the space current conditions in the tube thereof.

9. In an electrical synchronizing system a source of synchronizing pulses having considerable harmonic content, a sine wave oscillator capable of synchronization, a second electrical wave generator means including a discharge tube, means for applying said synchronizing pulses to said sine wave oscillator such to maintain synchronized operation of the since wave oscillator at a harmonic of the repetition rate of the synchronizing signal, means applying the output of said second electrical wave generator for synchronizing the second wave generator by the signal derived from the output of the sine wave oscillator, said second generator being adapted for operation at a sub-harmonic of the sine oscillator, means causing said synchronizing pulses to appear in the output of the sine wave oscillator in such a way as to aid the sine wave oscillator in controlling operation of the second wave generating means, means responsive to the space current of said second electrical wave generating discharge tube to develop a control potential, and means controlling the amplitude of signal developed by said sine wave oscillator in accordance with said control potential.

FREDERICK A. LINDLEY.
FREDERICK M. ARBUCKLE.

REFERENCES CITED

The following references are of record in the file of this patent:

UNITED STATES PATENTS

| Number | Name | Date |
|---|---|---|
| 2,196,845 | Andricu | Apr. 9, 1940 |
| 2,250,284 | Wendt | July 22, 1941 |
| 2,277,000 | Bingley | Mar. 17, 1942 |
| 2,389,025 | Campbell | Nov. 13, 1945 |
| 2,424,905 | Scheldorf | July 29, 1947 |
| 2,445,933 | Beste | July 27, 1948 |
| 2,448,070 | Sunstein | Aug. 31, 1948 |
| 2,466,782 | Robins | Apr. 12, 1949 |